United States Patent
Barooah

(10) Patent No.: US 11,549,710 B2
(45) Date of Patent: Jan. 10, 2023

(54) MODEL PREDICTIVE CONTROL-BASED BUILDING CLIMATE CONTROLLER INCORPORATING HUMIDITY

(71) Applicant: UNIVERSITY OF FLORIDA RESEARCH FOUNDATION, INCORPORATED, Gainesville, FL (US)

(72) Inventor: Prabir Barooah, Gainesville, FL (US)

(73) Assignee: University of Florida Research Foundation, Incorporated, Gainesville, FL (US)

(*) Notice: Subject to any disclaimer, the term of this patent is extended or adjusted under 35 U.S.C. 154(b) by 29 days.

(21) Appl. No.: 16/930,569

(22) Filed: Jul. 16, 2020

(65) Prior Publication Data

US 2021/0018206 A1    Jan. 21, 2021

Related U.S. Application Data

(60) Provisional application No. 62/876,196, filed on Jul. 19, 2019.

(51) Int. Cl.
*F24F 11/47* (2018.01)
*F24F 11/00* (2018.01)
(Continued)

(52) U.S. Cl.
CPC .......... *F24F 11/47* (2018.01); *F24F 11/0008* (2013.01); *F24F 11/52* (2018.01); *F24F 11/56* (2018.01); *F24F 11/61* (2018.01); *F24F 11/64* (2018.01); *F24F 11/65* (2018.01); *F24F 11/72* (2018.01); *G05B 19/042* (2013.01); *F24F 2110/10* (2018.01); *F24F 2110/12* (2018.01); *F24F 2110/20* (2018.01); *F24F 2110/22* (2018.01); *G05B 2219/2614* (2013.01)

(58) Field of Classification Search
CPC .. F24F 11/47; F24F 11/46; F24F 11/64; F24F 11/65; F24F 2110/10; F24F 2110/20
See application file for complete search history.

(56) References Cited

U.S. PATENT DOCUMENTS

| 11,274,849 B2 * | 3/2022 | Bell | F24F 11/58 |
| 2007/0181701 A1 * | 8/2007 | Cheng | F24F 11/83 |
| | | | 236/49.3 |

(Continued)

*Primary Examiner* — Mohammad Ali
*Assistant Examiner* — Vincent W Chang
(74) *Attorney, Agent, or Firm* — Alston & Bird LLP

(57) ABSTRACT

Systems and methods are configured to control operation of an HVAC system providing climate control for a zone of a structure. In various embodiments, a constrained optimization problem is performed to set control commands for controlling operation of the HVAC system to achieve one or more objectives while providing a supply air flow at an air temperature and a humidity ratio for the zone at a future time. For instance, the optimization problem may include a cost function having constraints based on a desired temperature setpoint and a humidity ratio for the zone. A value is set for each control command based on the performance of the constrained optimization problem to achieve at least one of the objectives and as a result, the supply air flow at the air temperature and humidity ratio is provided by the HVAC system at the future time to the zone based on the values.

18 Claims, 7 Drawing Sheets

(51) Int. Cl.
*F24F 11/52* (2018.01)
*F24F 11/56* (2018.01)
*F24F 11/61* (2018.01)
*F24F 11/64* (2018.01)
*F24F 11/72* (2018.01)
*G05B 19/042* (2006.01)
*F24F 11/65* (2018.01)
*F24F 110/10* (2018.01)
*F24F 110/12* (2018.01)
*F24F 110/20* (2018.01)
*F24F 110/22* (2018.01)

(56) References Cited

U.S. PATENT DOCUMENTS

| | | | | |
|---|---|---|---|---|
| 2013/0043319 | A1* | 2/2013 | Cheng | F24F 3/0442 236/46 R |
| 2016/0305678 | A1* | 10/2016 | Pavlovski | G05B 15/02 |
| 2016/0313751 | A1* | 10/2016 | Risbeck | G05B 13/048 |
| 2017/0115650 | A1* | 4/2017 | Holleran | H04L 67/12 |
| 2018/0142915 | A1* | 5/2018 | Mady | F24F 11/61 |
| 2019/0226708 | A1* | 7/2019 | Craft | G05B 19/41885 |
| 2019/0338977 | A1* | 11/2019 | Turney | F24F 11/52 |
| 2020/0041158 | A1* | 2/2020 | Turney | F24F 11/00 |
| 2020/0348038 | A1* | 11/2020 | Risbeck | F24F 11/52 |

* cited by examiner

US 11,549,710 B2

MODEL PREDICTIVE CONTROL-BASED BUILDING CLIMATE CONTROLLER INCORPORATING HUMIDITY

CROSS-REFERENCE TO RELATED APPLICATIONS

This application claims the benefit of U.S. Provisional Patent Application Ser. No. 62/876,196, filed Jul. 19, 2019, which is incorporated herein by reference in its entirety, including any figures, tables, and drawings.

SUPPORT STATEMENT

This invention was made with government support under 1463316 and 1646229 awarded by the National Science Foundation. The Government has certain rights in the invention. In addition, this invention was made in part by funding received by the Florida Department of Agriculture and Consumer Services. The Government has certain rights in the invention.

TECHNICAL FIELD

The present disclosure relates to the technical field of Model Predictive Control (MPC) for energy efficient climate control of structures.

BACKGROUND

The application of Model Predictive Control (MPC) for climate control of buildings has been an active area of research for the past few years. The advantage of MPC over traditional rule-based controllers is that MPC can satisfy conflicting goals such as reducing energy use while maintaining the indoor climate in a thermally comfortable region. Thermal comfort is influenced by several factors such as space temperature, humidity, air speed, clothing, metabolic rate, etc. Space temperature and humidity are especially important factors in determining comfort and health.

Despite the importance of humidity, it has been mostly ignored in existing MPC formulations. That is because including humidity poses a considerable challenge. The principal challenge is that variables that determine the building's temperature and humidity, that is temperature and humidity of the conditioned air, typically cannot be independently chosen. The control commands that can be independently chosen are inlet conditions of the cooling coil that cools and dehumidifies the air supplied to the indoor space. Thus, incorporating humidity into MPC typically requires a model of the cooling coil that predicts how control command (conditions at the coil inlet) determines the temperature and humidity of the conditioned air. However, such models are usually highly complex. For example, some such models are partial differential equations (PDEs) having a large number of parameters and several sub-models based on the condition of the cooling coil such as completely dry, completely wet, and partly wet. While other models are ordinary differential equations or even static models consisting of a large number of empirical relations that vary depending on coil geometry, configuration, and manufacturer. Such complex models are not suitable for optimization-based real-time control. In addition, nonlinearities in the humidity dynamics make the underlying optimization problem non-convex.

Current rule-based controllers use conservatively designed rules that have been developed after decades of experience. For instance, a widely used heuristic in hot humid climates is to keep the conditioned air setpoint at 55° F. (285.93 K). This low value ensures the air delivered to the indoor space is dry enough to maintain humidity within allowable limits under worst-case conditions. However, the downside is worst-case conditions occur rarely, which leads to inefficient energy use. Not only is the air cooled unnecessarily, but it must then be reheated to prevent the indoor space from becoming too cold.

It is still possible to design an MPC controller to minimize energy use (or energy cost), but one that does not account explicitly for humidity constraints, to make correct decisions under high heat load conditions. This is because such a controller can recognize that the conditioned air temperature must be low enough to maintain the indoor temperature within allowable limits. This decision may have an unintended but good side effect of maintaining space humidity. However, such a controller is likely to make decisions in the interest of reducing energy/cost that result in violating humidity constraints under mild heat load conditions with high outdoor humidity. For instance, on a summer night the controller is likely to decide that slightly cooler outside air can provide free cooling, although the high humidity of the outside air can lead to indoor humidity higher than the allowed limit. Such "optimal" decisions overlong periods of time can lead to issues such as mold growth, a critical health concern in hot humid climates.

Therefore, a need exists in the industry for an MPC controller for energy efficient climate control of a structure (e.g., building) in which humidity is explicitly considered. It is with respect to these considerations and other that the disclosure herein is presented.

BRIEF SUMMARY

In general, embodiments of the present invention provide methods, apparatus, systems, computing devices, computing entities, and/or the like for controlling operation of an HVAC system providing climate control for a zone of a structure. In various embodiments, a constrained optimization problem is performed to set one or more control commands for controlling operation of the HVAC system to achieve one or more objectives while providing a supply air flow at a supply air temperature and a supply air humidity ratio for the zone at a future time. For instance, in particular embodiments, the optimization problem may include a cost function having constraints based on at least a desired temperature setpoint for the zone and a humidity ratio for the zone.

In some embodiments, the objectives may include minimizing power consumption of an air supply fan, a cooling coil, and/or a heating coil of the HVAC system. In addition, in some embodiments, the constraints may be based on thermal dynamics of the zone, a cooling coil model, a upper limit and a lower limit for at least one of a temperature of the zone and the humidity ratio of the zone, and/or a capability of at least one of an air supply fan, a cooling coil, a heating coil, and one or more damper actuators of the HVAC system. For instance, in particular embodiments, the constraints may be based on a control-oriented cooling coil model with outputs being a polynomial function of inputs configured to formulate the constrained optimization problem as a nonlinear program.

A value is set for each of the one or more control commands based on the performance of the constrained optimization problem to achieve at least one of the objectives and as a result, the supply air flow at the supply air temperature and the supply air humidity ratio is provided by the HVAC system at the future time to the zone of the structure based on the value of each of the control commands. For instance, in particular embodiments, the one or more control commands may include an supply air flow, an outdoor air ratio, a conditioned air temperature, and/or a supply air temperature. Here, the HVAC system may use these control commands to regulate a temperature, humidity ratio, and/or air flow incident on a cooling coil, as well as a temperature and/or flow rate of chilled water entering the cooling coil to provide the supply air flow at the supply air temperature and the supply air humidity ratio at the future time. As discussed further herein, these operations can be performed in various embodiments as one or more successive iterations to control operation of the HVAC system.

BRIEF DESCRIPTION OF THE DRAWINGS

Figure 1:
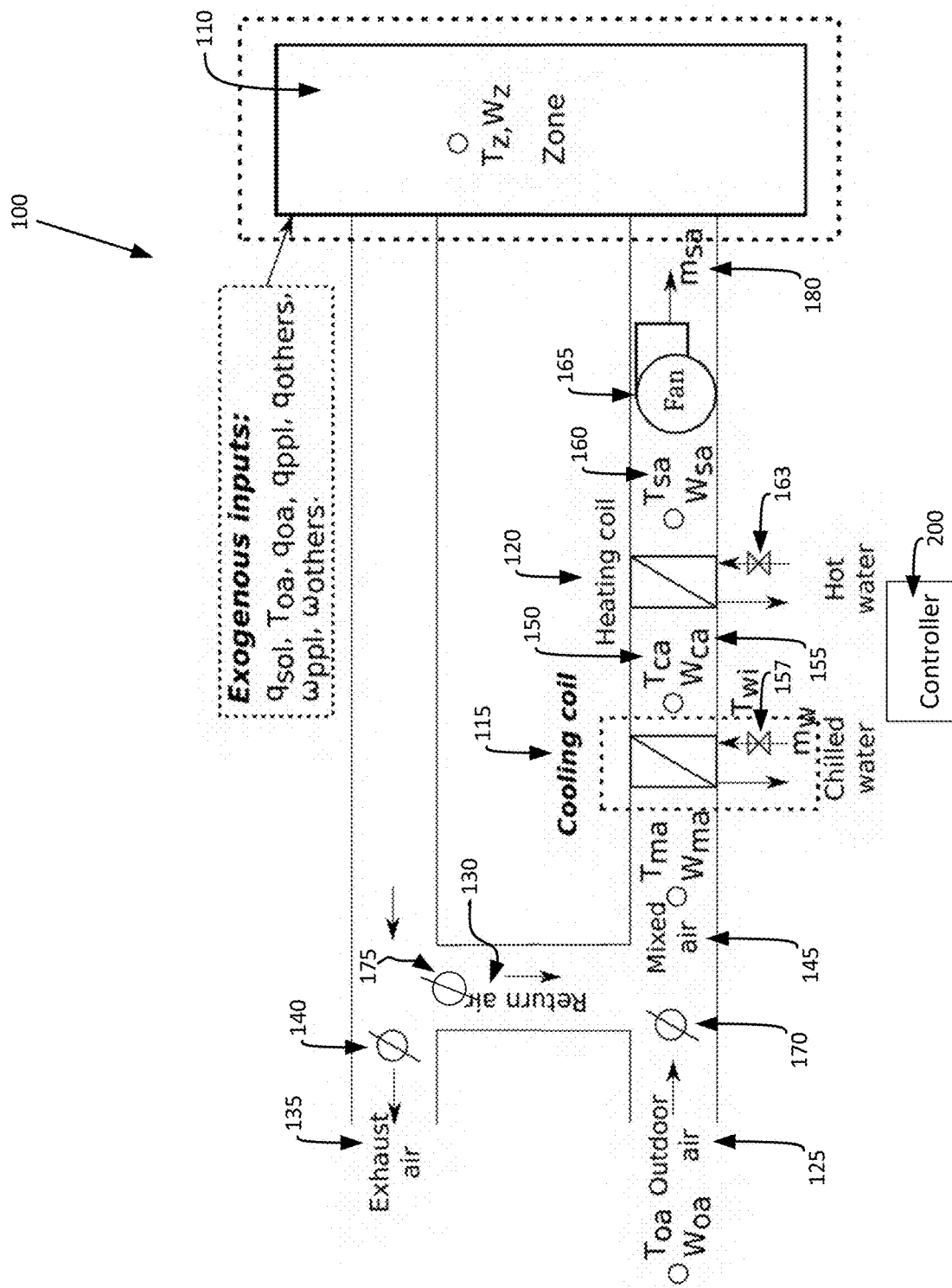
Figure 2:
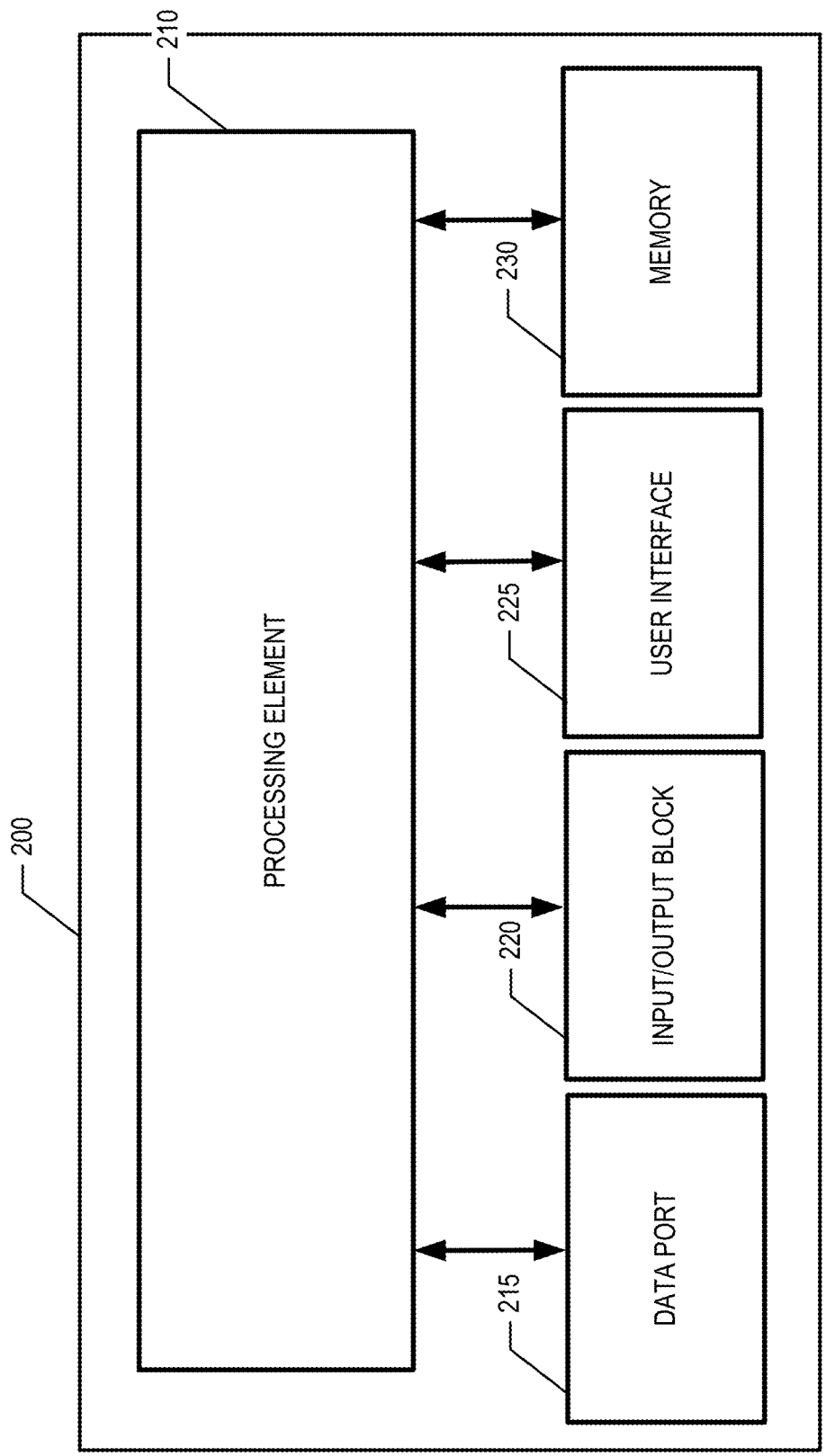
Figure 3:
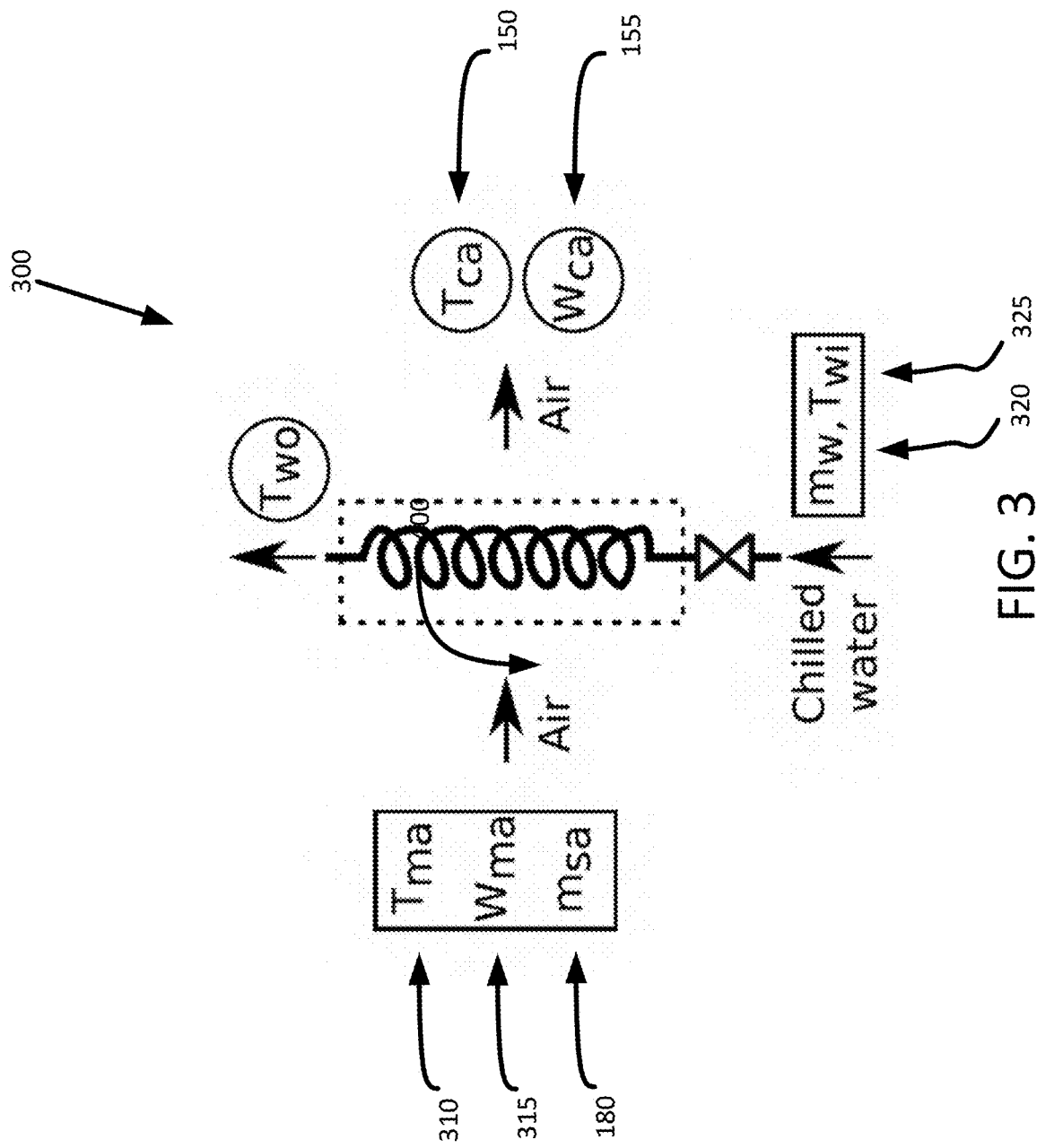
Figure 4:
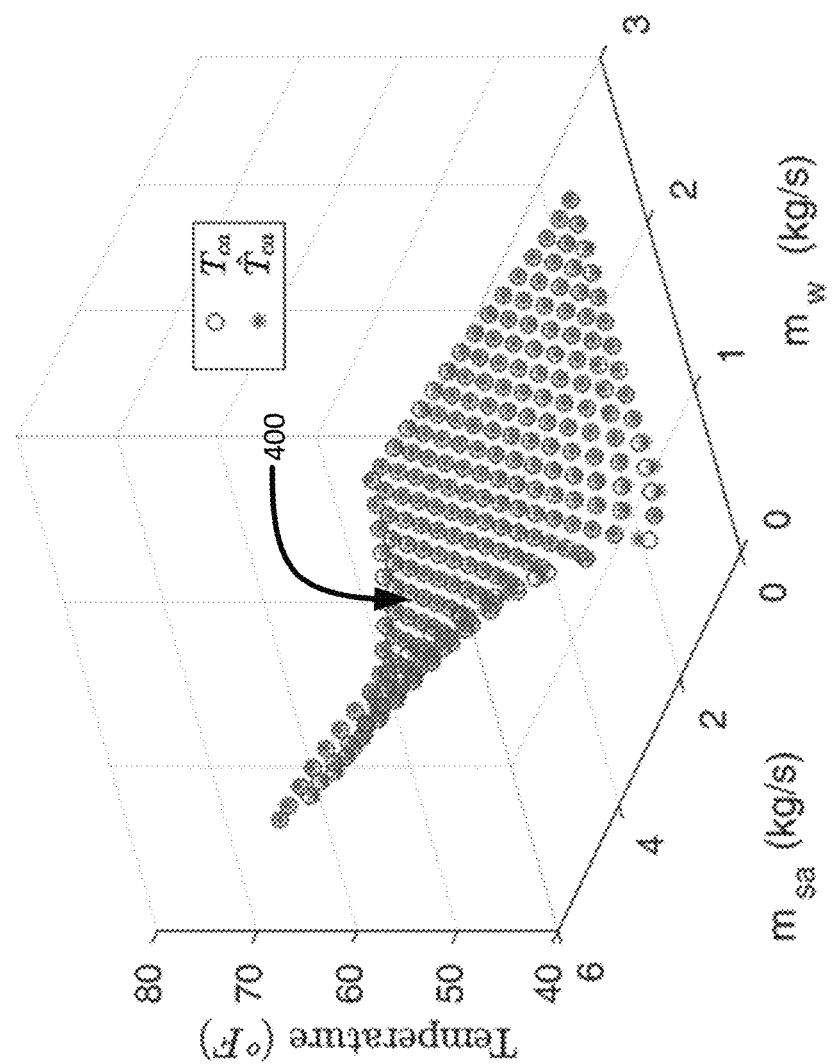
Figure 5:
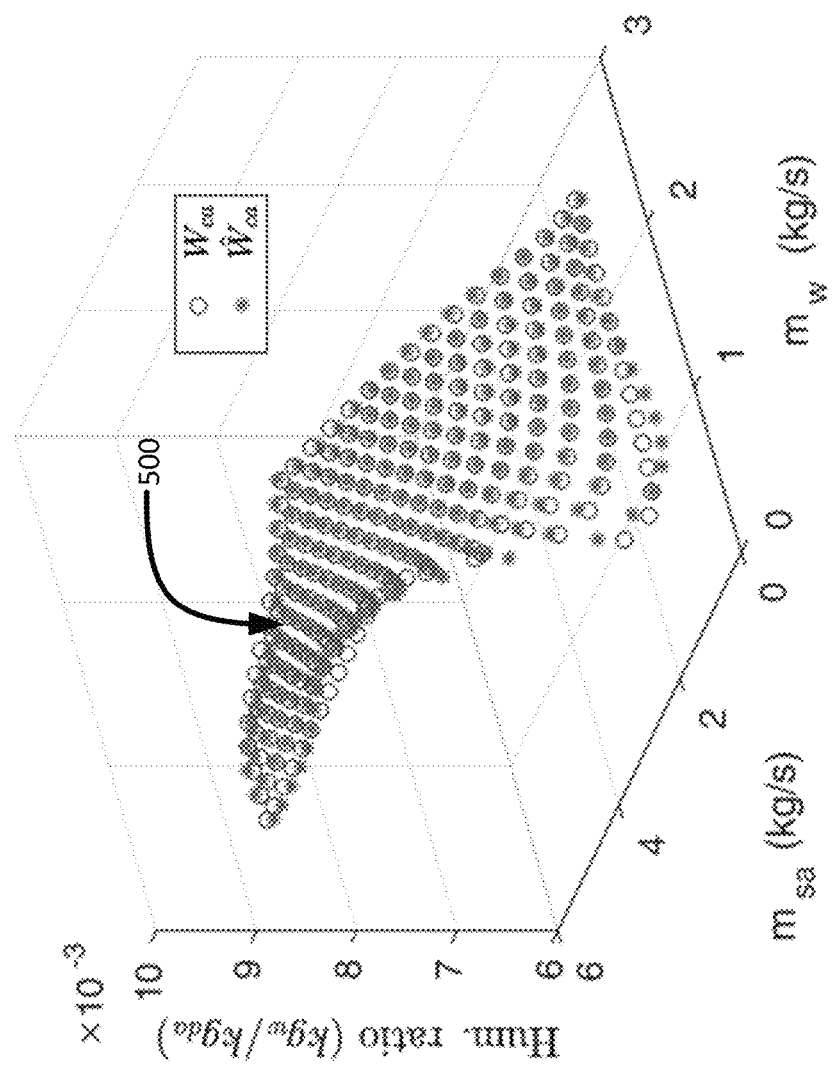
Figure 6:
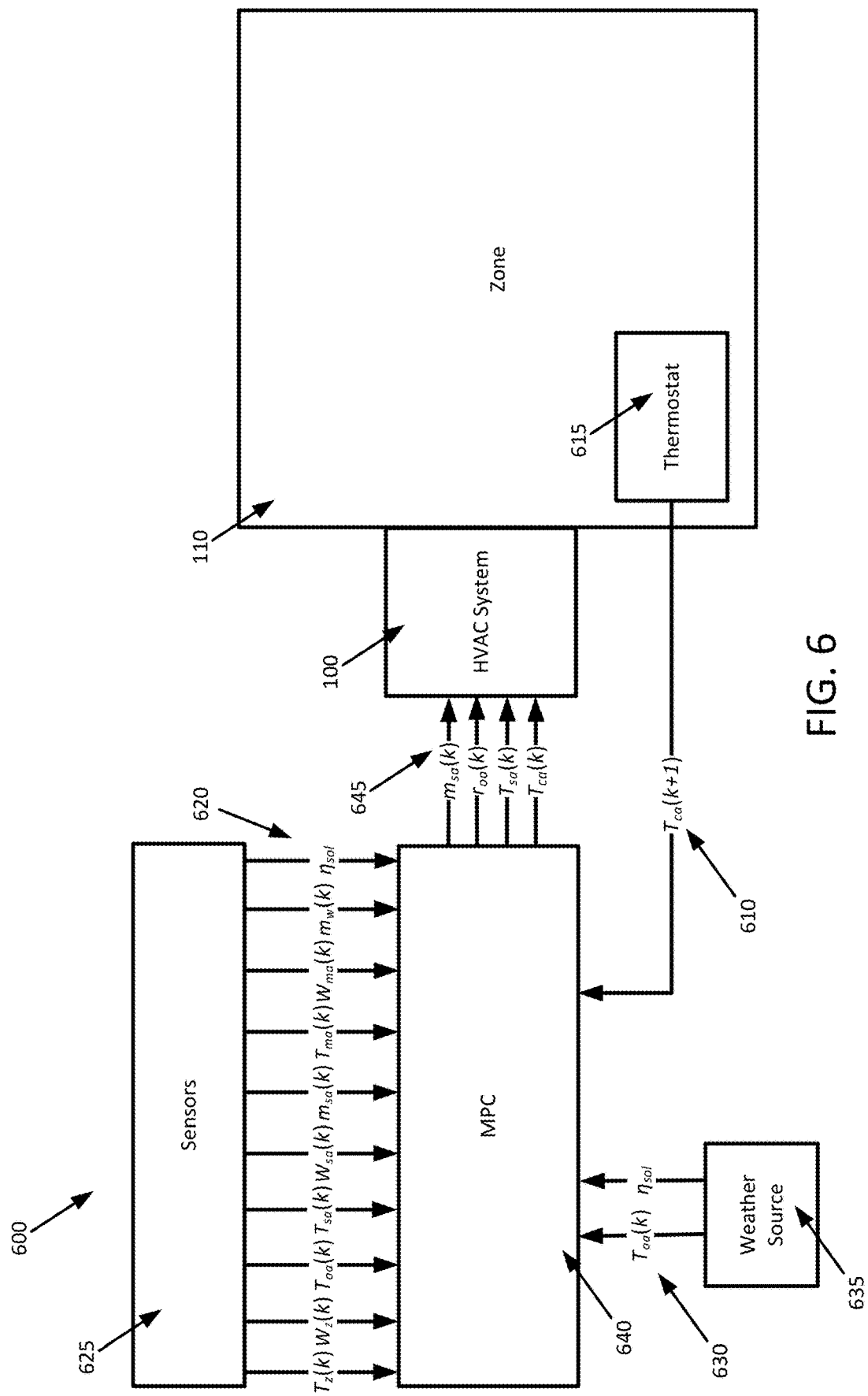
Figure 7:
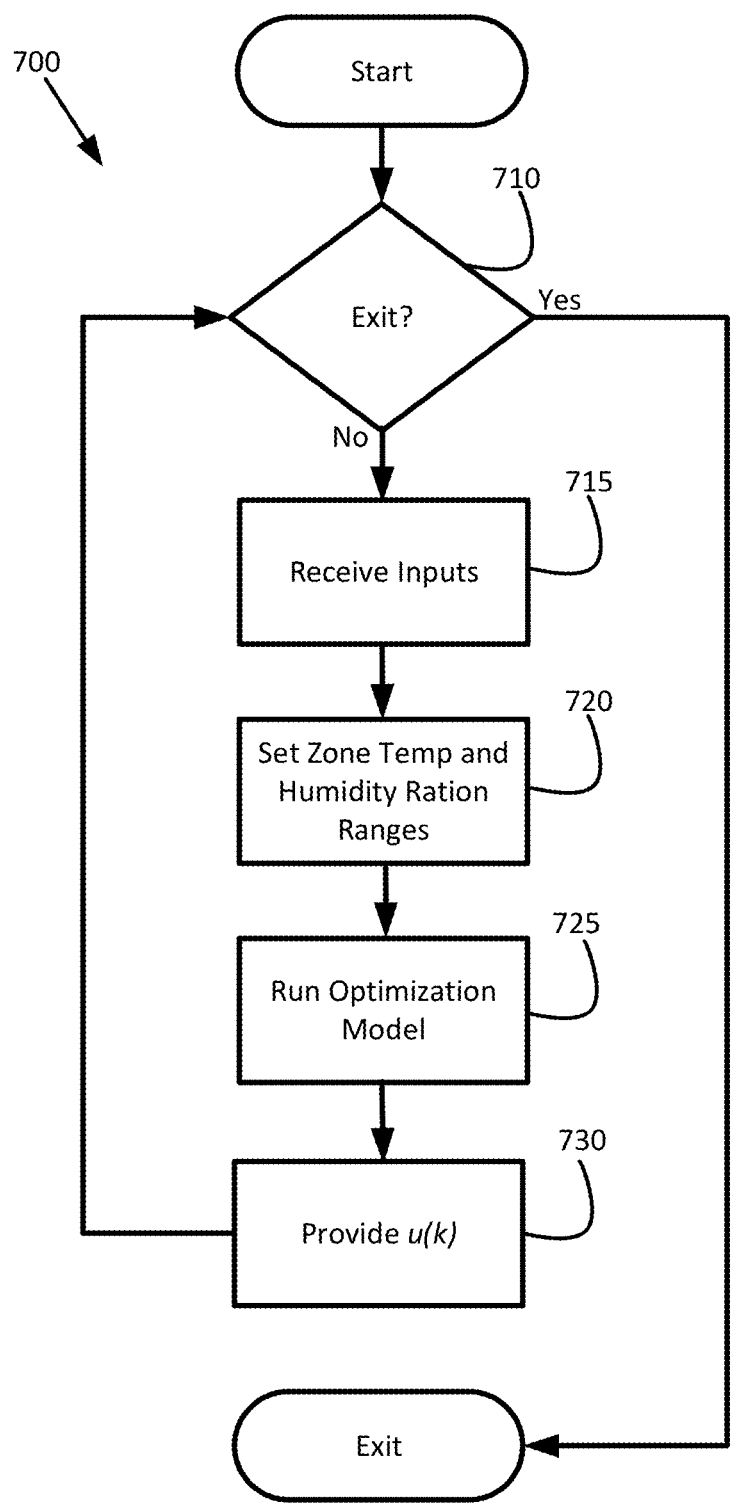

Having thus described the invention in general terms, reference will now be made to the accompanying drawings, which are not necessarily drawn to scale, and wherein:

FIG. 1 is a schematic of a single-zone commercial variable-air-volume HVAC system that may be used in accordance with some embodiments disclosed herein;

FIG. 2 is a schematic of a controller that may be used in accordance with various embodiments disclosed herein;

FIG. 3 illustrates a cooling coil model that may be used in accordance with various embodiments disclosed herein;

FIG. 4 is a three-dimensional graph of measured conditioned air temperature and predicted conditioned air temperature at various supply air flow rates and chilled water flow rates;

FIG. 5 is a three-dimensional graph of measured humidity ratio and predicted humidity ratio at various supply air flow rates and chilled water flow rates;

FIG. 6 is a schematic of a closed-loop control that may be used in accordance with various embodiments disclosed herein; and FIG. 7 is a process flow for controlling an HVAC system while minimizing power consumption in accordance with various embodiments disclosed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

Brief Overview of Various Embodiments

Described generally herein are systems, methods, devices and computer program products providing an MPC formulation for energy efficient climate control for a structure that explicitly accounts for humidity. Here, a structure may be some type of construction in which climate is controlled such as a building. In some embodiments, a system can comprise a thermostatic device (such as an MPC controller) configured to measure and/or receive environmental conditions in a structure or a structure zone and communicate setpoints associated with particular environmental conditions to HVAC equipment. In some embodiments, the system can further comprise an equipment controller configured to receive communications related to setpoints associated with particular environmental conditions, such as from the thermostatic device, and cause control of the HVAC equipment.

Algorithms and/or other mathematical models are used in various embodiments to predict one or more setpoints for the HVAC equipment to achieve a particular value or range for an environmental condition at a predetermined future time. In some embodiments, control systems can use sensors or the like to measure an array of environmental conditions associated with the building or a building zone. Here, the control systems can comprise one or more processors and one or more memory devices storing computer program code. In some embodiments, the control systems can be configured to store and commence algorithm-based processes and methods, such as predictive models representing complex dynamical HVAC systems.

In addition, in some embodiments, an MPC controller can employ an algorithm or other such formulation that explicitly accounts for humidity constraints alongside temperature and other environmental factors. For instance, in particular embodiments, the MPC controller optimizes one or more objective functions to modify one or more environmental conditions by causing the HVAC equipment to heat, ventilate, air condition, humidify, dehumidify, or otherwise modify environmental conditions of the building or building zone.

Further, various embodiments involve the use of low complexity cooling coil model(s). A hurdle in incorporating humidity into an MPC formulation is the lack of a control-oriented cooling coil model that can predict temperature and humidity of the conditioned air (outputs) as a function of the inputs: the temperature; humidity; flow rate of the air incident on the coil; and temperature and flow rate of the chilled water entering the coil. Accordingly, various embodiments provide a data-driven low order model that is less complex than many existing coil models. In addition, various embodiments provide a slightly more complex data driven model of the cooling coil that has much higher accuracy, although this model is not preferred for most optimization due to its structure. The model can be used, for instance, to simulate a plant.

Finally, MPC controllers making use of these embodiments of the MPC formulation reduce energy use significantly compared to conventional MPC controllers. Accordingly, in particular embodiments, the space humidity constraint is often active for long periods of time during hot humid weather, especially at night. Therefore, without explicitly considering humidity in these instances, a conventional controller would likely cause high space humidity in an effort to reduce energy use.

Computer Program Products, Systems, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages.

An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably).

Such non-transitory computer-readable storage media include all computer-readable media (including volatile and non-volatile media).

In one embodiment, a non-volatile computer-readable storage medium may include a floppy disk, flexible disk, hard disk, solid-state storage (SSS)(e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary HVAC Systems

Described hereinafter are examples of HVAC systems that can be used in accordance with various embodiments of the invention. One of ordinary skill in the art should understand that these examples in no way should be interpreted to limit the scope of the disclosure with regard to the HVAC systems, associated equipment, and devices, or configurations described herein. For example, various embodiments may be used in conjunction with a hydronic HVAC system such as a hydronic variable air volume (VAV) HVAC system, an HVAC system that includes a split heating and cooling system, or a hybrid split system. While in other instances, embodiments may be used in conjunction with a packaged heating and air system, a hybrid heat pump system, or a constant air volume (CAV) system such as a CAV single duct air system with constant airflow.

In some instances, the HVAC system may include a variable refrigerant flow (VRF) system, such as a heat-pump system using refrigerant as the heating and cooling medium. The VRF system may include a condensing unit with one or more evaporators. In some instances, the HVAC system may include a chilled beams system, such as an active chilled beams system or a passive chilled beams system. In other instances, the HVAC system can comprise a heat pump, such as a water to water heat pump, a water to air heat pump, or an air to air heat pump. While in some instances, the HVAC system can include fan coils, blower coils, unit ventilators, ceiling fans, a displacement ventilation system, a geothermal system, a hybrid geothermal system, combinations thereof, or the same. Further, the HVAC system can be a central plant HVAC system or a secondary HVAC system. In addition, the HVAC system can include a high energy impact complex controls system, a hydronic system controls system, and/or a multi-zone VRF system.

FIG. 1 is a schematic diagram of an illustrative single-zone variable-air-volume HVAC system 100 in a structure zone 110. For instance, the structure may be a residential, commercial, or any other suitable building and the zone may be a section of the building. Here, the HVAC system 100 includes one or more cooling and/or heating coils 115, 120. In addition, the HVAC system 100 includes at least two inputs and one output. The first input corresponds to a fresh outdoor air input 125. The temperature and/or flow rate of the fresh outdoor air input 125 may be measured or otherwise determined by one or more sensors, computational methods, and/or other methods. Additionally, other characteristics, such as humidity, dew point, carbon dioxide level, etc., of the fresh outdoor air input 125 may be measured and/or determined.

A second input to the HVAC system 100 may correspond to the return air input 130. The return air input 130 may include air that is pulled from inside the structure zone 110. In some instances, some of the return air may be exhausted 135 through a damper 140 and some of the return air may be recirculated back into the system 100. The temperature and/or flow rate of the return air input 130 may be measured and/or otherwise determined by one or more sensors, computational methods, and/or other methods. Additionally, other characteristics of the return air input 130 may be measured and/or determined.

A mixed air stream 145 may correspond to the HAVC system output. The mixed air stream 145 may be a mixture of the fresh outdoor air input 125 and the return air input 130. Accordingly, the mixed air stream 145 is sent through the cooling coil 115 to cool and dehumidify the air to a conditioned air temperature ($T_{ca}$) 150 and humidity ratio ($W_{ac}$) 155. Valves 157 can be actuated to vary the chilled water flow rate to the cooling coil 115. This air is then passed through the heating coil 120 to heat the air to a supply air temperature ($T_{sa}$) 160. Reheating power can be controlled using a heating hot water valve 163 to control the supply rate of heating hot water into and out of the heating coil 120, or a knob that controls the amount of heating if the heating is performed by an electric heating element. The HVAC system 100 may include a fan 165 to induce air flow through the HVAC system 100 and ductwork to provide the supply air to the structure zone 110. The temperature and/or flow rate of the mixed air stream 145 may be measured and/or otherwise determined by one or more sensors, computational methods, and/or other methods. Additionally, other characteristics of the mixed air stream 145 may be measured and/or determined.

A damper 170 may be provided to regulate the flow of fresh outdoor air 125 into the structure zone 110. In addition, as already discussed, a damper 140 may be provided to regulate the amount of return air that is exhausted 135 from the structure zone 110. Further, a damper 175 may be provided to regulate the flow of return air 130 to mix with the fresh outdoor air 125. In some instances, two or more of the dampers 140, 170, 175 may be mechanically coupled together so that they open and close together, in sequence, and/or in an opposite manner to one another. For example, when the damper 170 is opened to allow more fresh outdoor air into the structure zone 110, the damper 140 may also open to allow a similar amount of return air to be exhausted from the structure zone 110. In addition, the return air damper 175 may close as the other dampers 140, 170 open. This arrangement may help balance the pressure inside the HVAC system 100.

As previously mentioned, the HVAC system 100 may include one or more sensors. For instance, the system 100 may include one or more sensors configured to sense the temperature and humidity inside the structure zone 110. In addition, the HVAC system 100 may include one or more sensors configured to sense the temperature of the conditioned air 150 leaving the cooling coil 115. The HVAC system 100 may also include one or more sensors configured to sense the temperature of the supply air 160 leaving the heating coil 120. Further, the HVAC system 100 may comprise one or more sensors configured to measure the flow rate of the total, e.g., mixed, air supplied 180 to the structure zone 110, as well as to measure the flow rate of the outdoor air supplied to the structure zone 110. Furthermore, the HVAC system 100 may comprise one or more sensors configured to sense the number of occupants in the structure zone 110. Finally, the HVAC system 100 may be in communication with a third party such as a web-based weather service, system, apparatus, or device configured to forecast outdoor temperature and humidity.

Finally, the HVAC system 100 may include a controller 200 that provides control commands to the system 100. FIG. 2 provides a schematic view of a controller 200 that may be used in accordance with various embodiments. The controller 200 includes a processing element (e.g. microprocessor, microcontroller, etc.) 210, a user interface 225, and memory 230. In addition, the controller 210 includes an input/output block (I/O block) 220 for receiving one or more signals from the HVAC system 100 and/or for providing one or more control signals to the HVAC system 100. In some instances, the I/O block 220 may communicate with another controller that is in communication with the HVAC system 100, such as, for example, a zone panel in a zoned HVAC system. The I/O block 220 may include one or more control terminals (e.g., input terminals, output terminals, universal terminals, etc.) for optionally interfacing with one or more HVAC components via control wires. The I/O block 220 may also include a wireless interface for wirelessly communicating with one or more wireless devices.

The functionality of the inputs and/or output terminals of the I/O block 220 may be fixed or programmable. For instance, the functionality of each of the output terminals may be dedicated to send commands to a specified HVAC component (e.g., coiling coil 115 and/or heating coil 120) and/or the selected functionality of each of the input terminals may be dedicated to receiving control signals from a specified HVAC component (e.g., sensor). In some cases, some of the terminals may be "universal" type terminals that may be connected to a variety of different HVAC components, and the functionality of each of these inputs/output terminals may be programmed to support the particular HVAC components that are ultimately connected to the corresponding universal inputs/outputs in the field.

The user interface 225 may be any suitable user interface that permits the controller 200 to, for example, display and/or solicit information, as well as accept one or more user interactions from a user. In some instances, the user interface 225 may permit a user to enter data such as temperature set points, humidity set points, starting times, ending times, diagnostic limits, conditions under which diagnostic limits may be suspended, responses to alerts, and the like. In addition, the user interface 225 may include a display and a distinct keypad. For example, the user interface 225 may be a touch screen LCD panel that functions as both display and keypad.

The memory 230 may be used to store any desired information, such as control algorithm(s), set points, schedule times, diagnostic limits such as, for example, differential pressure limits, and the like. The memory 230 may be any suitable type of storage device including, but not limited to, RAM, ROM, EPROM, flash memory, a hard drive, and/or the like. Accordingly, the controller 210 may store information within the memory 230, and may subsequently retrieve the stored information during operation.

The controller 200 may also include a data port 215. The data port 215 may be a wireless port such as a Bluetooth™ port or any other wireless protocol. In other instances, the data port 215 may be a wired port such as a serial port, a parallel port, a CATS port, a USB (universal serial bus) port, and/or the like. For example, the data port 215 may be a USB port and may be used to download and/or upload information from a USB flash drive or some other data source. Other remote devices may also be employed, as desired. Accordingly, the data port 215 may be configured to communicate with the controller 200 and may, if desired, be used to upload information to the controller 200 and/or download information from the controller 200.

Accordingly, the controller 200 is configured in various embodiments to read information from various sensors configured to measure different temperatures, humidity, pressures, flow rates, or other information as described above about the operation of the HVAC system 100. The controller 200 can be provided with setpoints that represent desired values of measured signals of the process such as a desired zone temperature. Setpoint information can come from a thermostat, wireless remote control, or internal memory or storage media. As described further herein, the controller 200 can then compute control inputs such that some measured outputs are driven to their setpoints. These control inputs can include supply air flow rate ($M_{sa}$ 180), outdoor air ratio ($r_{oa}$, which is the ratio of outdoor air flow rate to supply air flow rate), conditioned air temperature ($T_{ca}$ 150), and supply air temperature ($T_{sa}$ 160) to maintain thermal comfort and indoor air quality in the structure zone 110. In this manner, the controller 200 controls operation of the HVAC system 100 such that the setpoint values are achieved Exemplary System Operation The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Closed Loop Operation of Various Embodiments

Various embodiments of the invention are directed to intelligent control systems and methods for providing efficient climate control of a structure. Here, a model predictive control (MPC) architecture is used to make optimal climate control decisions in real time. In particular embodiments, the optimization problem is formulated as a nonlinear program (NLP). Accordingly, the climate controller 200 is configured to vary the supply air flow rate ($m_{sa}$ 180), outdoor air ratio ($r_{oa}$, which is the ratio of outdoor air flow rate to supply air flow rate), conditioned air temperature ($T_{ca}$ 150), and supply air temperature ($T_{sa}$ 160) to maintain thermal comfort and indoor air quality in a zone 110 of the structure. In addition, models for power consumed by an air supply fan 165, cooling coil 115, and heating coil 120 may be used to facilitate meeting a desired goal such as, for example, minimizing energy consumed.

Several mathematical models are now introduced that are used in various embodiments of the invention. These particular models are discussed with respect to mimicking a real HVAC system 100 that is to be used to control the climate of a structure. Here, the plant configuration and parameters are chosen to mimic a HVAC system (plant) configured to serve a 465 m² (5000 sq.ft.) structure zone 110. However, those of ordinary skill in the art will understand the models can be adjusted to accommodate HVAC systems for other structure zones in light of this disclosure.

Hygro-Thermal Dynamics Model

In various embodiments, a hygro-thermal dynamics model, such as a resistor-capacitor network model, is used for the temperature dynamics of the zone 110 serviced by the HVAC system 100, such as in equations (1) and (2):

$$C_z \dot{T}_z(t) = \frac{(T_w(t) - T_z(t))}{R_w} + q_{HVAC}(t) + A_c \eta_{sol}(t) + q_{ppl}(t) + q_{others}(t) \tag{1}$$

$$C_w \dot{T}_w(t) = \frac{(T_{oa}(t) - T_w(t))}{R_z} + \frac{(T_z(t) - T_w(t))}{R_w} \tag{2}$$

where $T_z$ is the zone temperature, $T_w$ is the wall temperature, $T_{oa}$ is the outdoor air temperature, $q_{HVAC}$ is the heat influx due to the HVAC system 100, $\eta_{sol}$ is the solar irradiance, $q_{ppl}$ is the occupant-induced internal heat load, $q_{others}$ is the heat load due to other sources such as lighting and equipment, $C_z$ and $C_w$ are the thermal capacitance of the zone and the wall respectively, $R_z$ is the resistance to heat exchange between the outdoors and wall, $R_w$ is the resistance to heat exchange between the wall and indoors and $A_e$ is the effective area of the building. The heat influx due to the HVAC system 100 is a function of the supply air temperature ($T_{sa}$ 160) and zone temperature, such as in equation (3):

$$q_{HVAC}(t) = m_{sa}(t) C_{pa}(T_{sa}(t) - T_z(t)), \tag{3}$$

where $m_{sa}$ 180 is the supply air flow rate and $C_{pa}$ is the specific heat of air at constant pressure. The dynamics of zone humidity ratio $W_z$ can be modeled as in equation (4):

$$W_z(t) = \frac{R_g T_z(t)}{VP^{da}} \left[ \omega_{ppl}(t) + \omega_{others}(t) + m_{sa}(t) \frac{W_{sa}(t) - W_z(t-1)}{1 + W_{sa}(t)} \right] \tag{4}$$

where V is the zone volume, $R_g$ is the specific gas constant of dry air, $P^{da}$ is the partial pressure of dry air, $W_{sa}$ is the supply air humidity ratio, $\omega_{ppl}$ and $\omega_{others}$ are the rate of internal water vapor generation due to people and other sources, respectively.

Cooling Coil Model

In various embodiments, the inputs for the cooling coil model 300 are supply air flow rate ($m_{sa}$) 180, mixed air temperature ($T_{ma}$) 310, mixed air humidity ratio ($W_{ma}$) 315, chilled water flow rate ($m_w$) 320, and inlet water temperature ($T_{wi}$) 325. While the outputs are conditioned air temperature ($T_{ca}$) 150 and humidity ratio ($W_{ca}$) 155 as shown in FIG. 3. Modeling of coiling and dehumidifying coils is abundant. However, many of these models require coil geometry data that is difficult to obtain. Another class of models involve complex partial differential equations. With respect to various embodiments, a simple static model is used for a cooling coil 115 as the time constraints are small—about 60 to 120 seconds—compared to the time constants of zone thermal dynamics, which is on the order of a few hours.

For example, in some embodiments, the model found in EnergyPlus™ can be used to model the cooling coil 115. Although this model is still complex and difficult to replicate as it involves many empirical relations, a grey box data-driven model can be used and EnergyPlus™ can be used as a "virtual cooling coil testbed." Accordingly, the data collected from EnergyPlus™ simulations can then be used to fit the parameters of the model. An example simulation of a HVAC system is explained below.

Here, a single-zone commercial building can be simulated in Energy-Plus version 8.9, with a cooling coil pulling in unmixed outdoor air and supplying it to the zone after cooling it. Using unmixed air provides for full control over the temperature and humidity ratio of air entering the cooling coil, as EnergyPlus™ allows the use of a custom generated weather file to specify outdoor conditions. The HVAC air loop also contains a variable flow fan motor to control the mass flow rate of air, and the plant loop contains an electric chiller with variable flow pump to control the mass flow rate of water. The inlet and outlet conditions of the cooling coil are measured.

Accordingly, the rates of flow through the pump and fan can be varied with each timestep of the simulation using Building Controls Virtual Test Bed (BCVTB). For example, the air flow rate can be varied from 0.1705 kg/s (300 ft³/min) to 4.6 kg/s (8100 ft³/min) and the water flow rate can be varied from 0 kg/s (0 gallons/minute) to 2.21 kg/s (35 gallons/minute). The temperature and humidity ratio of outdoor air can be controlled using a custom weather file. Since there are no other components before the coil that interact with outdoor air, it is possible to use the coil to modulate the input conditions to the coil. During the simulation, the temperature can be varied from 283.15 K (50° F.) to 316.483 K (110° F.) with steps of 0.5556 K (1° F.). In addition, the relative humidity can be varied from 10% to 100% with steps of 5%. In addition, a separate data set may be generated for model validation.

Such simulations have shown that for a fixed mixed air temperature ($T_{ma}$) 310 and relative humidity ($W_{ma}$) 315, the outputs conditioned air temperature ($T_{ca}$) 150 and conditioned humidity ratio ($W_{ca}$) 155 can be predicted by modeling them as polynomial functions of the mass flow rates of chilled water ($m_w$) 320 and supply air ($m_{sa}$) 180. For example, FIGS. 4 and 5 illustrate measured outputs from EnergyPlus™ simulations using a 5$^{th}$ degree polynomial. In particular, FIG. 4 illustrates measured ($T_{ca}$ 150 output from EnergyPlus™ simulations) and predicted value of conditioned air temperature ($\hat{T}_{ca}$) 400 for a specific bin ($T_{ma}$=75° F. and $RH_{ma}$=50%). FIG. 5 illustrates measured ($W_{ca}$ 155 output from EnergyPlus™ simulations) and predicted values of conditioned air humidity ratio ($\hat{W}_{ca}$) 500 for a specific bin ($T_{ma}$=75° F. and $RH_{ma}$=50%). In some instances, a single polynomial may lead to large errors when used at different mixed air temperatures and relative humidities. Therefore, the inputs can be binned according to $T_{ma}$ 310 and $RH_{ma}$, and a 5$^{th}$ degree polynomial model can be used for each bin, the resulting model being a "binned model." For the example, the root mean square error for the validation data was less than 0.278K (0.5° F., 1%) for $T_{ca}$ and $0.3 \times 10^{-4}$ $kg_w/kg_{da}$ (1%) for $W_{ca}$.

Power Consumption Models

With respect to power consumption, it can be assumed that the power consumed by components such as dampers is negligible and the only power consuming components are the air supply fan 165, the coiling coil 115, and the heating coil 120. For instance, the fan power can be modeled as a quadratic function of the supply air flow rate ($m_{sa}$) 180, such as in equation (5):

$$P_{fan} = \alpha_f m_{sa}(t)^2. \tag{5}$$

In addition, the power consumed by the cooling coil 115 can be modeled as being proportional to the heat it extracts from the mixed air stream 145, such as in equation (6):

$$P_{cc}(t) = \frac{m_{sa}(t)[h_{ma}(t) - h_{ca}(t)]}{\eta_{cc} COP_c}, \tag{6}$$

where $h_{ma}(t)$ and $h_{ca}(t)$ are the specific enthalpies of the mixed and supply air respectively, $\eta_{cc}$ is the cooling coil efficiency, and $COP_c$ is the chiller coefficient of performance. The specific enthalpy of moist air with temperature T and humidity ratio W is given by: $h(T,W) = C_{pa}T + W(g_{H20} + C_{pw}T)$, where $g_{H20}$ is the heat of evaporation of water at 273.15 K (0° C.), and $C_{pa}$ and $C_{pw}$ are specific heat of air and water at constant pressure.

The power consumed by the heating coil 120 can be modeled as being proportional to the heat added to the conditioned air stream by the coil 120. Since the humidity ratio does not change across the heating coil ($W_{sa}=W_{ca}$), the power consumption can be modeled according to equation (7):

$$P_{reheat}(t) = \frac{m_{sa}(t) C_{pa}[T_{sa}(t) - T_{ca}(t)]}{\eta_{reheat} COP_h}, \tag{7}$$

where $\eta_{reheat}$ is the reheat coil efficiency, and $COP_h$ is the boiler coefficient of performance.

Model Predictive Control (MPC)

Accordingly, control decisions for the HVAC system 100 is computed in discrete time indices k=0, 1, . . . and an optimization problem underlying the MPC controller is used in various embodiments with the following decision variables: states of the process $x(k)=[T_z(k),W_z(k)]^T$ and the control inputs $u(k)=[m_{sa}(k),r_{oa}(k),T_{sa}(k),T_{ca}(k)]^T$. The exogenous inputs are $w(k)=[T_{oa}(k),\eta_{solar}(k), q_{ppl}(k), q_{others}(k), \omega_{ppl}^{(k)}, \omega_{others}(k)]^T$ whose predictions are assumed known.

Accordingly, in various embodiments, the control commands for N time steps are obtained by solving a constrained optimization problem of minimizing the energy consumption subject to thermal comfort, indoor air quality, and actuator constraints. The control inputs are then obtained for the first time step and used to control the HVAC system 100. The optimization problem is then solved again for the next subsequent N time step with the initial state of the model obtained from measurements obtained for the structure zone 110. This process is repeated at each time instant to control the climate of the structure zone 110. Here, the states of the process model that appear in the optimization include zone temperature and humidity. Therefore, since these environmental conditions can be measured, a state estimator is not needed in various embodiments. Mathematically the optimization problem at time index j can be modeled according to equation (8):

$$\min_{U,X} \sum_{k=j}^{j+N-1} [P_{fan}(k) + P_{cc}(k) + P_{reheat}(k)]\Delta t \quad (8)$$

subject to the following constraints (9)-(23):

$$T_z(k+1) = \quad (9)$$
$$T_z(k) + \frac{\Delta t}{C}\left[\frac{(T_{oa}(k) - T_z(k))}{R} + q_{HVAC}(k) + A_e\eta_{sol}(k) + q_{ppl} + q_{others}(k)\right]$$

$$W_z(k+1) = \quad (10)$$
$$W_z(k) + \frac{\Delta t R_g T_z(k)}{VP^{da}}\left[\omega_{ppl}(k) + \omega_{others}(k) + m_{sa}(k)\frac{W_{sa}(k) - W_z(k)}{1 + W_{sa}(k)}\right]$$

$$T_{ca}(k) = f_{co}(T_{ma}(k), W_{ma}(k), m_{sa}(k), m_w(k)) \quad (11)$$

$$W_{ca}(k) = g_{co}(T_{ma}(k), W_{ma}(k), m_{sa}(k), m_w(k)) \quad (12)$$

$$T_z^{low}(k) \leq T_z(k) \leq T_z^{high}(k) \quad (13)$$

$$W_z^{low}(k) \leq W_z(k) \leq W_z^{high}(k) \quad (14)$$

$$m_{sa}(k+1) \leq \min(m_{sa}(k) + m_{sa}^{rate}\Delta t, m_{sa}^{high}) \quad (15)$$

$$m_{sa}(k+1) \geq \max(m_{sa}(k) - m_{sa}^{rate}\Delta t, m_{sa}^{low}) \quad (16)$$

$$r_{oa}(k+1) \leq \min(r_{oa}(k) + r_{oa}^{rate}\Delta t, r_{oa}^{high}) \quad (17)$$

$$r_{oa}(k+1) \geq \max(r_{oa}(k) - r_{oa}^{rate}\Delta t, r_{oa}^{low}) \quad (18)$$

$$T_{ca}(k+1) \leq \min(T_{ca}(k) + T_{ca}^{rate}\Delta t, T_{ma}(k+1)) \quad (19)$$

$$T_{ca}(k+1) \geq \max(T_{ca}(k) - T_{ca}^{rate}\Delta t, T_{ca}^{high}) \quad (20)$$

$$T_{sa}(k+1) \leq \min(T_{sa}(k) + T_{sa}^{rate}\Delta t, T_{sa}^{high}) \quad (21)$$

$$T_{sa}(k+1) \geq \max(T_{sa}(k) - T_{sa}^{rate}\Delta t, T_{ca}(k+1)) \quad (22)$$

$$W_{ca}(k) \leq W_{ma}(k). \quad (23)$$

Constraints (9)-(12) and (23) are for k=j, . . . , j+N−1. Constraints (13) and (14) are for k=j+1, . . . , j+N. Constraints (15)-(22) are for k=j, . . . , j+N−2.

The equations for $P_{fan}$, $P_{cc}$, and $P_{reheat}$ in constraint (8) are the same as those described above with regard to the power consumption models (e.g., equations (5), (6), and (7)). Constraint (9) is due to the thermal dynamics of the zone 110, which can be modeled as a discretized form of a first-order resistor-capacitor (RC) network model where R is the resistance to heat exchange between outdoors and indoors, and C is the thermal capacitance of the zone 110. This particular constraint is used in particular embodiments because it can be a simpler model of building hygro-thermal dynamics than what is used in the plant simulation. Constraint (10) is due to the zone humidity dynamics, which can be modeled as a discretized form of equation (4) presented above with regard to the hygro-thermal dynamics model.

In addition, constraints (11) and (12) are for the cooling coil model described further herein. Constraints of equations (13) and (14) specify the range in which the zone temperature and humidity ratio can vary so that the thermal comfort of the occupants is satisfied. In particular instances, the upper limits and lower limits for these can be varied based on the scheduled hours of occupancy of the building or building zone. Typically, the limits during unoccupied mode (unocc) are relaxed when compared to the occupied mode (occ), e.g., $[T_z^{low,occ}, T_z^{high,occ}] \subseteq [T_z^{low,unocc}, T_z^{high,unocc}]$, $[W_z^{low,occ}, W_z^{high,occ}] \subseteq [W_z^{low,unocc}, W_z^{high,unocc}]$. Accordingly, in various embodiments, the inclusion of the zone's humidity ratio in the MPC formulation makes it easier (e.g., less complex, more optimizable, etc.) to enforce humidity constraints.

Further, constraints (15) and (16) account for the capabilities of the fan 165. In some embodiments, the minimum allowed value for the supply air flow rate ($m_{sa}$) 180 is computed based on the ventilation requirements specified in ASHRAE 62.1. Here, at least two factors can be considered: number of people and floor area. The minimum allowed supply air flow rate can be modeled according to equation (24):

$$m_{sa}^{low} = (m_{oa}^P n_P + m_{oa}^A A)/r_{oa}, \quad (24)$$

where $m_{oa}^P$ is the outdoor air rate required per person, $n_p$ is the number of people, $m_{oa}^A$ is the outdoor air required per zone area, A is the zone area, and $r_{oa}$ is the outdoor air ratio.

Constraints (17)-(22) account for the capabilities of the damper actuators and cooling and heating coils 115, 120. The inequalities $T_{ca}(k+1) \leq T_{ma}(k+1)$ and $W_{ca}(k) \leq W_{ma}(k)$ in constraints (19) and (23) ensure that the cooling coil 115 can only cool and dehumidify the mixed air stream 145. Similarly, the inequality $T_{sa}(k+1) \geq T_{ca}(k+1)$ in constraint (22) ensures that the heating coil 120 can only add heat.

Accordingly, in various embodiments, the MPC control process includes, is associated with, or refers to a control-oriented cooling coil model. This is done because even though the binned model of the cooling coil presented herein is quite accurate, such a model cannot be used for the optimizer in many instances because doing so makes the optimization problem a mixed integer nonlinear programming (MINLP) problem that is challenging to solve. Therefore, a control-oriented cooling coil model can be used that makes the optimization problem a nonlinear program (NLP) that is relatively less complex to solve. For instance, in particular embodiments, the control-oriented cooling coil model may be a static model with outputs being polynomial functions of the inputs. When the chilled water flow rate is zero, no cooling or dehumidifying of the air can occur so that the conditioned air temperature ($T_{ca}$) 150 and humidity ratio ($W_{ca}$) 155 must be equal to the mixed air temperature ($T_{ma}$) 310 and humidity ratio ($W_{ma}$) 315: $T_{ca}=T_{ma}$ and $W_{ca}=W_{ma}$ when $m_w=0$. To make the model have this behavior, a functional form can be used such as in equations (25) and (26):

$$T_{ca}=T_{ma}+m_w f(T_{ma},W_{ma},m_{sa},m_w) \quad (25)$$

$$W_{ca}=W_{ma}+m_w g(T_{ma},W_{ma},m_{sa},m_w) \quad (26)$$

In some embodiments, for the functions $f$ and $g$, a quadratic form can be used as higher degree polynomials did not show substantial gain in accuracy. As such, a final form of the model can be used such as in equations (27) and (28):

$$T_{ca} = f_{co}(T_{ma}, W_{ma}, m_{sa}, m_w) = \quad (27)$$
$$T_{ma} + m_w \big[\alpha_1 T_{ma} + \alpha_2 W_{ma} + \alpha_3 m_{sa} + \alpha_4 m_w + \alpha_5 + \alpha_6 T_{ma}^2 + \alpha_7 W_{ma}^2 +$$
$$\alpha_8 m_{sa}^2 + \alpha_9 m_w^2 + \alpha_{10} T_{ma} W_{ma} + \alpha_{11} W_{ma} m_{sa} + \alpha_{12} m_{sa} m_w + \alpha_{13} m_w T_{ma}\big]$$

$$W_{ca} = g_{co}(T_{ma}, W_{ma}, m_{sa}, m_w) = \quad (28)$$
$$T_{ma} + m_w \big[\beta_1 T_{ma} + \beta_2 W_{ma} + \beta_3 m_{sa} + \beta_4 m_w + \beta_5 + \beta_6 T_{ma}^2 + \beta_7 W_{ma}^2 +$$
$$\beta_8 m_{sa}^2 + \beta_9 m_w^2 + \beta_{10} T_{ma} W_{ma} + \beta_{11} W_{ma} m_{sa} + \beta_{12} m_{sa} m_w + \beta_{13} m_w T_{ma}\big],$$

where the $\alpha_i$ terms and $\beta_j$ terms are model parameters to be determined. Depending on the embodiment, data obtained from EnergyPlus™ simulations (as described herein), experimental or pilot testing, feedback data from HVAC equipment, or any other suitable data can be used to fit these parameters.

Closed Loop Control

In various embodiments, closed loop control involves utilizing the models presented above in light of the interactions between the controller 200 and the HVAC system 100 to maintain thermal comfort and indoor air quality in a structure zone 110 based on a desired temperature setpoint. Turning now to FIG. 6, a closed loop control operation 600 that may be used in accordance with various embodiments of the present invention is shown. Here, the closed loop control operation 600 is configured to provide the HVAC system 100 with certain inputs used in controlling the temperature ($T_z$) and humidity ratio ($W_z$) in the zone 110. Specifically, the closed loop control operation 600 provides control commands for $m_{sa}$ 180, $r_{oa}$, $T_{ca}$ 150, and $T_{sa}$ 160 to the HVAC system 100 for controlling the climate of the zone 110.

Therefore, looking at FIG. 6, the closed loop control operation 600 receives a desired temperature setpoint ($T_{ca}$ (k+1)) 610 for the zone 110 from some device such as a thermostat 615 located within the zone 110. With that said, in some embodiments, the setpoint 610 may be stored and retrieved from memory. In addition, the closed loop control operation 600 receives information 620 from several sensors 625 that may be located throughout the HVAC system 100 and/or zone 110. These sensors 625 are used for measuring current conditions for the HVAC system 100 and/or zone 110 such as, for example, zone, supply air, and mixed air temperatures, as well as zone, supply air, and mixed air humidity ratios. In addition, the closed loop control operation 600 may receive information 630 from other sources such as a weather source 635 to obtain the current outside air temperature (Toa(t)) and solar irradiance. Although in other instances, such information 630 may also be monitored and received from sensors 625. This information 620,630 is then used as inputs to the model predictive control 640 to determine the command controls 645 for the HVAC system 100 to be used to control the climate of the zone 110 to attempt to achieve the desired temperature 610.

For instance, in particular embodiments, the controller 200 described in FIGS. 1 and 2 performs the closed loop control operation 600 and uses the determined command controls 645 to set parameters for operating the HVAC system 100 to attempt to achieve the desired temperature 610 while also meeting other objectives. Such as, for example, an objective may be to minimize the power consumed by components within the HVAC system 100 such as the air supply fan 165, cooling coil 115, and heating coil 120.

Accordingly, this operation is performed as successive iterations, resulting in the command controls being recalculated at successive times (e.g., every five minutes) and applied by the controller 200 accordingly. This allows the closed loop control operation 600 in various embodiments to make optimal decisions with respect to operating the HVAC system 100 to provide energy efficient climate control of the structure zone 110 in which humidity is explicitly considered.

Controller Module

Turning now to FIG. 7, additional details are provided regarding a process flow for controlling an HVAC system 100 while minimizing power consumption according to various embodiments. Here, FIG. 7 is a flow diagram showing a controller module for performing such functionality according to various embodiments of the invention. For example, the flow diagram shown in FIG. 7 may correspond to operations carried out by a processor element 210 in a controller 200, as it executes the controller module.

Accordingly, the controller module is configured in various embodiments to perform iterations of the closed loop control operation 600 explained above with respect to FIG. 6. The process flow 700 begins with the controller module determining whether to exit in Operation 710. For instance, as previously mentioned, the controller 200 may be used for providing control commands to an HVAC system 100. Therefore, in particular embodiments, the controller module may be configured to determine whether or not the HVAC system has been shut down in Operation 710. If so, then the controller module may exit.

However, if the controller module determines not to exit, then the model receives information to use as inputs in Operation 715. As previously explained, this information may include a desired temperature setpoint for the zone 110 being controlled. For instance, the controller module may receive the temperature setpoint from a thermostat located in the zone, a remote control device, or some other device. While in some instances, the controller module may read the temperature setpoint from some storage device (e.g., memory 230 in the controller 200). In addition, the information may include current readings provided by various sensors 625 used throughout the HVAC system 100 and zone 110 being controlled. For example, such sensors 625 may provide current readings of temperatures such as the zone temperature ($T_z(t)$), supply air temperature ($T_{sa}(t)$), and mixed air temperature ($T_{ma}(t)$), as well as flow rates such as the supply air flow rate ($m_{sa}(t)$) and chilled water flow rate ($m_w(t)$) for the cooling coil. Further, the information may include current readings for humidity ratios such zone humidity ratio ($W_z(t)$), supply air humidity ratio ($W_{as}(t)$), and mixed air humidity ratio ($W_{ma}(t)$).

Furthermore, in particular embodiments, the controller module may gather information from the current weather forecast such as the current outside air temperature ($T_{oa}(k)$) and solar irradiance ($n_{sol}(t)$). Here, depending on the embodiment, the weather forecast information may be queried from any one of a number of different external sources such as a weather service that is accessible over a network (e.g., the Internet) and the like.

Next, the controller module sets the zone temperature and humidity ratio ranges according to allow for the thermal comfort of the occupants in Operation 720. As previously mentioned, the upper and lower limits for the zone temperature and humidity can be varied based on the scheduled hours of occupancy. For example, the schedule occupancy may be between 8:00 AM to 5:00 PM during which the following constraints can be used: $T_z^{low,occ}=295.094K$ (71.5° F.); $T_z^{high,occ}=296.761K$ (74.5° F.); $W_z^{low,occ}=0.0049$ $kg_w/kg_{da}$; $W_z^{high,occ}=0.0109$ $kg_w/kg_{da}$. The unoccupied hours may be between 5:00 PM to 8:00 AM during which the following constraints can be used-T $T_z^{low,occ}=294.261K$ (70° F.); $T_z^{high,occ}=297.594K$ (76° F.), $W_z^{low,occ}=0.0049$ $kg_w/kg_{da}$; $W_z^{high,occ}=0.0109$ $kg_w/kg_{da}$. Here, the controller module may be configured to read the current time and set the zone temperature and humidity ratio ranges (upper and lower limits) accordingly.

Furthermore, in particular embodiments, the controller module may set values for additional parameters such as outdoor air rate required per person ($m_{oa}^P$) and outdoor air rate required per zone area ($m_{oa}^A$) based on the American Society of Heating, Refrigerating, and Air-Conditioning Engineers (ASHRAE) standard 62.1 for the zone 110. In addition, the controller module may set values for high supply air flow rate (e.g., $m_{sa}^{high}=4.6$ kg/s), the rated supply air flow (e.g., $m_{sa}^{rate}=0.2$ kg/s/min), low conditioned air temperature (e.g., $T_{ca}^{low}=283.15K$), rated conditioned air temperature (e.g., $T_{ca}^{rate}=0.5556K/min$), low supply air temperature (e.g., $T_{sa}^{high}=303.15K$), rated supply air temperature (e.g., $T_{sa}^{rate}=0.5556K/min$), low outdoor air ratio (e.g., $r_{oa}^{low}=0\%$), high outdoor air ratio (e.g., $r_{oa}^{high}=100\%$), rated outdoor air ratio (e.g., $r_{oa}^{rate}=6\%/min$), number of people (e.g., $n_p=175$), the zone area (e.g., $A=465$ m$^2$), and zone volume (e.g., $V=2832$ m$^3$). Here, depending on the embodiment, these values may be provided by different devices and/or read from some storage device (e.g., memory 230 in the controller 200)

At this point, the controller module runs the optimization model in Operation 725. Accordingly, the controller module performs the optimization based on the inputs and the cost function previously discussed. The controller module then applies the result of the optimization to set the control commands and provides them to the controller 200 of the HVAC system 100 in Operation 730. For example, in particular embodiments, the control commands include values for supply air flow rate ($M_{sa}$ 180), outdoor air ratio ($r_{oa}$), conditioned air temperature ($T_{ca}$ 150), and supply air temperature ($T_{sa}$ 160). Here, the controller 200 may use these values to regulate the temperature, humidity, and/or flow rate of the air incident on the cooling coil 115, as well as temperature and/or flow rate of the chilled water entering the coil 115.

As a result, the HVAC system 100 is set to generate conditioned air and humidity ratio ($T_z(k+1)$ and $W_z(k+1)$) to attempt to achieve the desired temperature 610 ($T_{ca}(k+1)$). In addition, the HVAC system 100 is set to do so while minimizing the power consumed by the by the air supply fan 165, cooling coil 115, and heating coil 120.

The controller module then returns to Operation 710 and determines whether to exit or not. If the module determines not to exit, then the controller module performs another iteration of the operations just discussed to set the command controls based on the current conditions being experienced with respect to the current environment for the zone 110 being controlled. In particular embodiments, the controller module may be configured to perform iterations for a set sampling period such as, for example, every five minutes. Therefore, the process flow 700 is continued in a closed loop fashion to control the operation of the HVAC system 100 until the flow 700 exits.

Advantages of Various Embodiments

MPC controllers utilizing various embodiments of the MPC control process described herein are able to reduce energy use considerably over conventional controllers while maintaining zone temperature and humidity in allowable limits. As previously mentioned, conventional MPC controllers typically do not explicitly consider humidity are therefore are likely to make decisions that violate humidity constraints under hot-humid conditions, especially during nighttime. This is because a conventional controller often decides that slightly cooler outside air during the nighttime can provide "free" cooling, although the high humidity of the outside air can cause the indoor humidity to exceed the allowed limit. Accordingly, if this situation occurs for thirteen out of twenty-four hours every day for several months for example, serious and costly issues such as mold growth and deterioration of HVAC equipment and other infrastructure can occur.

Apart from maintaining humidity, a MPC controller utilizing various embodiments of the MPC control process described herein is able to reduce energy use considerable over conventional controllers. Such reduction may be due to at least one of two reasons.

Firstly, a conventional controller is typically configured to maintain the conditioned air temperature at a constant value that is designed for worst-case heat load conditions. Such a configuration can lead to highly sub-optimal decisions when the heat load is small, and therefore can lead to large energy use. In fact, under such circumstances, not only is the air cooled unnecessarily, but also reheating must be performed to prevent the zone from becoming too cold, leading to additional energy use related to heating. On the other hand a MPC controller utilizing various embodiments of the invention may vary the conditioned air temperature throughout the day based on the zone humidity and/or the heat load in the zone, which can lead to a reduction in cooling coil energy consumption.

Secondly, reduction in air flow rate by the MPC controller utilizing various embodiments of the invention can lead to a reduction in fan and chiller energy consumption. The lower limit on the air flow rate can be dictated by the ventilation requirements as discussed herein. Increasing the outdoor air ratio can decrease this lower limit, but can also lead to an increase in cooling coil energy consumption. A MPC controller utilizing various embodiment of the invention chooses to reduce the outdoor air ratio during hotter hours and increase it at night. However, in the case of a conventional controller, since the outdoor air ratio is fixed, the lower limit on supply air flow rate is also fixed. As a result, when the zone temperature is within the cooling set point, the conventional controller may command the minimum air flow rate, which can still be higher than the one used by a MPC controller utilizing various embodiments of the invention. This can lead to a higher fan and cooling coil energy consumption.

Further, on mild or cold days, since the outdoor weather is typically dry, no matter what decisions are made by a controller, it is unlikely to violate humidity constraints in the building. However, a MPC controller utilizing various embodiments of the invention may choose to use as much outdoor air as possible since the mild/cold outdoor conditions provide free cooling without having to use chilled water and since introducing outdoor air (increasing the outdoor air ratio) may not cause the building or building zone to violate any maximum humidity requirements. Increasing the outdoor air ratio reduces the minimum required supply air flow rate, which can lead to lower fan and cooling energy consumption.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for controlling operation of an HVAC system providing climate control for a zone of a structure, the method comprising:
    performing a constrained optimization problem to set one or more control commands for controlling operation of the HVAC system to achieve one or more objectives for the zone at a future time, wherein:
        the control commands comprise configurations that cause the HVAC system to vary: (i) cooling and dehumidifying, via a cooling coil, of a mixture of outdoor air and return air to a conditioned air temperature, and (ii) heating, via a heating coil, of the cooled and dehumidified mixture of outdoor air and return air to a supply air temperature, and
        the constrained optimization problem comprises a cost function comprising one or more constraints based on at least: (i) a desired temperature setpoint for the zone, (ii) a humidity ratio for the zone, (iii) damper actuator capability, (iv) capability of the cooling coil, (v) capability of the heating coil, (vi) one or more models defined for one or more components of the HVAC system, and (vii) a control-oriented cooling coil model with outputs being a polynomial function of inputs configured to formulate the constrained optimization problem as a nonlinear program;
    setting a value for each of the one or more control commands based on the performance of the constrained optimization problem to achieve at least one of the one or more objectives; and
    transmitting the value of each of the one or more control commands to the HVAC system at the future time to the zone of the structure.

2. The computer-implemented method of claim 1 further comprising performing one or more successive iterations of performing the constrained optimization problem and setting the value for each of the one or more control commands to control operation of the HVAC system.

3. The computer-implemented method of claim 1, wherein the one or more objectives comprising minimizing power consumption by a least one of an air supply fan, the cooling coil, and the heating coil.

4. The computer-implemented method of claim 1, wherein the one or more constraints are based on at least one of thermal dynamics of the zone, an upper limit and a lower limit for at least one of a temperature of the zone and the humidity ratio of the zone, and a capability of an air supply fan.

5. The computer-implemented method of claim 1, wherein the one or more control commands comprises a supply air flow, an outdoor air ratio, the conditioned air temperature, and the supply air temperature.

6. The computer-implemented method of claim 5, wherein the HVAC system uses the control commands to regulate at least one of a temperature incident on the cooling coil, a humidity ratio incident on the cooling coil, an air flow rate incident on the cooling coil, a temperature of chilled water entering the cooling coil, and a flow rate of chilled water entering the cooling coil.

7. An apparatus for controlling operation of an HVAC system providing climate control for a zone of a structure, the apparatus comprising at least one processor and at least one memory including a computer program code, the at least one memory and the computer program code configured to, with the at least one processor, cause the apparatus to:
    perform a constrained optimization problem to set one or more control commands for controlling operation of the HVAC system to achieve one or more objectives for the zone at a future time, wherein:
        the control commands comprise configurations that cause the HVAC system to vary: (i) cooling and dehumidifying, via a cooling coil, of a mixture of outdoor air and return air to a conditioned air temperature, and (ii) heating, via a heating coil, of the cooled and dehumidified mixture of outdoor air and return air to a supply air temperature, and
        the constrained optimization problem comprises a cost function comprising one or more constraints based on at least: (i) a desired temperature setpoint for the zone, (ii) a humidity ratio for the zone, (iii) damper actuator capability, (iv) capability of the cooling coil, (v) capability of the heating coil, (vi) one or more models defined for one or more components of the HVAC system, and (vii) a control-oriented cooling coil model with outputs being a polynomial function of inputs configured to formulate the constrained optimization problem as a nonlinear program;
    set a value for each of the one or more control commands based on the performance of the constrained optimization problem to achieve at least one of the one or more objectives; and
    transmit the value of each of the one or more control commands to the HVAC system at the future time to the zone of the structure.

8. The apparatus of claim 7, wherein the at least one memory and the computer program code are configured to, with the at least one processor, cause the apparatus to perform one or more successive iterations of performing the constrained optimization problem and setting the value for each of the one or more control commands to control operation of the HVAC system.

9. The apparatus of claim 7, wherein the one or more objectives comprising minimizing power consumption by a least one of an air supply fan, the cooling coil, and the heating coil.

10. The apparatus of claim 7, wherein the one or more constraints are based on at least one of thermal dynamics of the zone, an upper limit and a lower limit for at least one of a temperature of the zone and the humidity ratio of the zone, and a capability of an air supply fan.

11. The apparatus of claim 7, wherein the one or more control commands comprises a supply air flow, an outdoor air ratio, the conditioned air temperature, and the supply air temperature.

12. The apparatus of claim 11, wherein the HVAC system uses the control commands to regulate at least one of a temperature incident on the cooling coil, a humidity ratio incident on the cooling coil, an air flow rate incident on the cooling coil, a temperature of chilled water entering the cooling coil, and a flow rate of chilled water entering the cooling coil.

13. A non-transitory computer storage medium comprising instructions for controlling operation of an HVAC system providing climate control for a zone of a structure, the instructions being configured to cause one or more processors to at least perform operations configured to:
   perform a constrained optimization problem to set one or more control commands for controlling operation of the HVAC system to achieve one or more objectives for the zone at a future time, wherein:
      the control commands comprise configurations that cause the HVAC system to vary: (i) cooling and dehumidifying, via a cooling coil, of a mixture of outdoor air and return air to a conditioned air temperature, and (ii) heating, via a heating coil, of the cooled and dehumidified mixture of outdoor air and return air to a supply air temperature, and
      the constrained optimization problem comprises a cost function comprising one or more constraints based on at least: (i) a desired temperature setpoint for the zone, (ii) a humidity ratio for the zone, (iii) damper actuator capability, (iv) capability of the cooling coil, (v) capability of the heating coil, (vi) one or more models defined for one or more components of the HVAC system, and (vii) a control-oriented cooling coil model with outputs being a polynomial function of inputs configured to formulate the constrained optimization problem as a nonlinear program;
   set a value for each of the one or more control commands based on the performance of the constrained optimization problem to achieve at least one of the one or more objectives; and
   transmit the value of each of the one or more control commands to the HVAC system at the future time to the zone of the structure.

14. The non-transitory computer storage medium of claim 13, wherein the instructions are configured to cause the one or more processors to at least perform operations configured to perform one or more successive iterations of performing the constrained optimization problem and setting the value for each of the one or more control commands to control operation of the HVAC system.

15. The non-transitory computer storage medium of claim 13, wherein the one or more objectives comprising minimizing power consumption by a least one of an air supply fan, the cooling coil, and the heating coil.

16. The non-transitory computer storage medium of claim 13, wherein the one or more constraints are based on at least one of thermal dynamics of the zone, an upper limit and a lower limit for at least one of a temperature of the zone and the humidity ratio of the zone, and a capability of an air supply fan.

17. The non-transitory computer storage medium of claim 13, wherein the one or more control commands comprises a supply air flow, an outdoor air ratio, the conditioned air temperature, and the supply air temperature.

18. The non-transitory computer storage medium of claim 17, wherein the HVAC system uses the control commands to regulate at least one of a temperature incident on the cooling coil, a humidity ratio incident on the cooling coil, an air flow rate incident on the cooling coil, a temperature of chilled water entering the cooling coil, and a flow rate of chilled water entering the cooling coil.

* * * * *